United States Patent [19]
Barber

[11] Patent Number: 5,619,120
[45] Date of Patent: Apr. 8, 1997

[54] LOW VOLTAGE POWER CONTROL

[76] Inventor: Benjamin Barber, 23 Chandler St., Watertown, Mass. 02172

[21] Appl. No.: 646,482

[22] Filed: May 8, 1996

Related U.S. Application Data

[63] Continuation of Ser. No. 272,785, Jul. 8, 1994, abandoned.
[51] Int. Cl.$^6$ ............................................. G05F 1/45
[52] U.S. Cl. ........................... 323/237; 323/320; 323/905
[58] Field of Search ............................. 323/237, 239, 323/246, 300, 320, 324, 905

[56] References Cited

U.S. PATENT DOCUMENTS

| | | | |
|---|---|---|---|
| 2,072,389 | 3/1937 | Stayton | 171/97 |
| 2,749,501 | 6/1956 | Bartlett | 323/21 |
| 2,766,372 | 10/1956 | Albris | 240/2 |
| 2,779,897 | 1/1957 | Ellis | 315/151 |
| 2,808,559 | 10/1957 | Engle | 323/21 |
| 3,160,808 | 12/1964 | Kruse | 323/239 |
| 3,353,029 | 11/1967 | Rolfes | 323/300 |
| 3,723,854 | 3/1973 | Kita | 323/246 |
| 3,740,541 | 6/1973 | Conradt | 240/2 W |
| 3,952,242 | 4/1976 | Ukai | 323/21 |
| 4,047,096 | 9/1977 | Madewell | 323/300 |
| 4,289,948 | 9/1981 | Jurek et al. | 323/300 |
| 4,744,014 | 5/1988 | Harris | 362/145 |
| 4,962,341 | 10/1990 | Schoeff | 307/200.1 |
| 4,996,471 | 2/1991 | Gallo | 323/246 |
| 5,148,098 | 9/1992 | Draxelmayr | 323/237 |
| 5,278,492 | 1/1994 | Huynh et al. | 323/320 |

FOREIGN PATENT DOCUMENTS

| | | | |
|---|---|---|---|
| 0460736 | 12/1991 | European Pat. Off. | H05B 39/04 |
| 2646736 | 11/1990 | France | H01R 25/16 |

Primary Examiner—Jeffrey L. Sterrett
Attorney, Agent, or Firm—Wolf, Greenfield & Sacks, P.C.

[57] ABSTRACT

A low voltage power control circuit supplies substantially equal voltages to a plurality of loads distributed along a pair of parallel wires. Moreover, the voltage delivered is automatically controlled by a feedback control circuit, so that the number of loads in the system may be varied without causing a substantial change in overall supply voltage supplied to the plurality of loads.

16 Claims, 10 Drawing Sheets

LOW VOLTAGE POWER CONTROL

This application is a continuation of application Ser. No. 08/272,785, filed Jul. 8, 1994 now abandoned.

FIELD OF THE INVENTION

The present invention relates to power control circuits. More particularly, the invention relates to power control circuits for low voltage lighting systems having multiple loads, and similar low voltage, multiple load systems.

BACKGROUND OF THE INVENTION

Two known low voltage lighting systems are illustrated in FIGS. 1 and 2. Such systems generally are supplied with operating power by a conventional house current circuit supplying about 120 volts AC. However, power is distributed to individual loads at a reduced voltage, for example, 12 volts AC.

The prior art system of FIG. 1 receives input power at 120 volts AC 101. The stepdown transformer 103 receives the input power on its primary side 103a and produces a low voltage output, such as a 12 volt AC output, on its secondary side 103b. Power at 12 volts AC is distributed to loads 105a–105d by parallel wires 107a and 107b. The described prior system suffers a disadvantage in that a lamp load which is electrically remote from stepdown transformer 103 (for example, lamp load 105d) will burn more dimly than an identical lamp load electrically close to stepdown transformer 103 (for example, lamp load 105a). This results from the resistive loss and consequent voltage drop ($V_d$) which occurs in wires 107a and 107b, as explained below.

A lamp intended to dissipate a particular power at a nigh voltage draws a lower current than a similar lamp designed to operate at the same power, but at a lower voltage. The relationship between power (P), voltage (V) and current (I) known as Watt's Law is: P=VI. But the voltage drop in the wires obeys Ohm's Law: $V_d$=IR, where R is the resistance of the wire. The problem of voltage drop is exacerbated in such low voltage systems, because in accordance with Watt's Law, the current drawn through the wires in a low voltage system output.

One solution to the problem discussed above is to distribute power at the high voltage, but locally reduce the voltage for each lamp, as illustrated in FIG. 2. In such a system, power is supplied at 120 volts AC 101 and distributed in parallel wires 201a and 201b. Each lamp load 105a–105d is associated with a corresponding local stepdown transformer 203a–203d. Although this conventional system significantly reduces the problem of a voltage drop in wires 201a and 201b, by significantly reducing the required current flow through those wires, it does so at the expense of requiring a stepdown transformer for each lamp load. Furthermore, although the voltage drop problem is greatly reduced, it is not eliminated.

Finally, low voltage systems such as described above are frequently configured to be flexible in the number and positioning of lamp loads with respect to distance along power distribution wires 107a and 107b or 201a and 201b. However, by changing the number of lamp loads present in the system, the total voltage drop is varied, resulting in an overall brightness change in the remaining lamp loads. This variation in brightness is another undesirable feature of systems of the prior art.

Therefore, it is desired to provide a system wherein a uniform, fixed voltage is provided at each lamp load. Such a system has been achieved by means of the present invention, whose principal aspects are now described.

SUMMARY OF THE INVENTION

In order to solve the problems of the prior art noted above, and achieve such other goals as will be evident to those skilled in the art, the present invention includes a number of aspects, which are summarized here.

According to a first aspect of the invention, The present invention may be incorporated in an electrical power control and distribution system including a voltage conversion circuit having a high voltage input and a low voltage output, and supplying current from the low voltage output to first and second terminals of a plurality of electrical loads. The high voltage input of the voltage conversion circuit is connected to a high voltage supply. The improvement according to the present invention includes a first supply wire running directly from the low voltage output to the first terminal of a first of the plurality of electrical loads, and thence to the first terminal of a last of the plurality of electrical loads; and a second supply wire running parallel to the first supply wire directly from the low voltage output to the second terminal of the last of the plurality of electrical loads, and thence to the second terminal of the first of the plurality of electrical loads.

In accordance with another aspect of the invention, there is provided an electrical power control and distribution system supplied by a high voltage supply, the system having a plurality of electrical loads connected thereto. The system may include a primary transformer having a high voltage input and a low voltage output; a first supply wire running directly from the low voltage output to the first terminal of a first of the plurality of electrical loads, and thence to the first terminal of a last of the plurality of electrical loads; a second supply wire running parallel to the first supply wire directly from the low voltage output to the second terminal of the last of the plurality of electrical loads, and thence to the second terminal of the first of the plurality of electrical loads; and means interposed between the high voltage supply and the nigh voltage input of the primary transformer, and having an input electrically connected between the first and second supply wires for controlling the high voltage input of the primary transformer such that a constant low voltage output is maintained despite fluctuations in load.

A number of variations on the above aspects of the present invention are possible. Some of these are now briefly discussed.

The means for controlling the high voltage input may include means connected between the first and second supply wires for sensing a feedback voltage stepdown; and a dimmer circuit connected in series with the high voltage input to the primary transformer, whereby the high voltage input of the primary transformer is controlled. The means for sensing of this variation may further include a reference transformer having an input side connected to high voltage supply and an output side producing a reference voltage; and a dimmer control element connected to receive the feedback voltage and further connected to receive, and adapted to provide an output controlling the dimmer circuit responsive to a difference between the reference voltage and the feedback voltage. Additionally, in accordance with this variation, there may be provided a system wherein the dimmer circuit includes a photoresistively controlled triac; and the dimmer control element includes a light source having an intensity which varies responsive to the difference between the feedback voltage and the reference voltage. Finally, in accordance with yet another aspect of this variation, there may be provided a system wherein the dimmer circuit includes a resistively controlled triac; and the dimmer control element includes a voltage controlled resistor having a resistance which varies responsive to the difference between the feedback voltage and the reference voltage.

BRIEF DESCRIPTION OF THE DRAWINGS

Embodiments of the present invention will now be discussed in connection with the figures. Like reference numerals indicate like elements in the figures, in which.

DETAILED DESCRIPTION

The present invention will be better understood in view of the following description, read in connection with the figures. A number of embodiments of the inventions are now described.

A first aspect of the present invention is now described in connection with FIG. 3. This aspect of the present invention permits each lamp load 105a–105d in a low voltage lighting system to receive power at the same voltage level. Therefore similar lamp loads will have a similar intensity.

Figure 1:
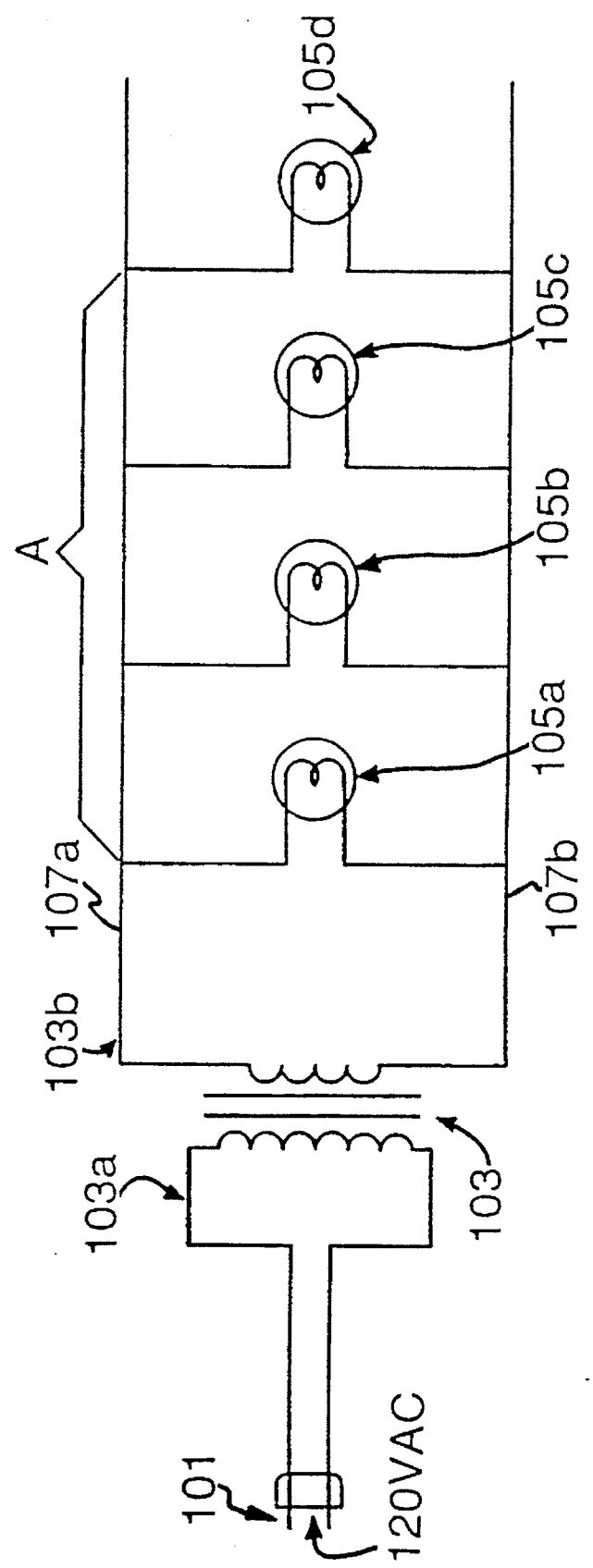
FIG. 1 is a schematic drawing of a prior art system employing a remote stepdown transformer.
Figure 2:
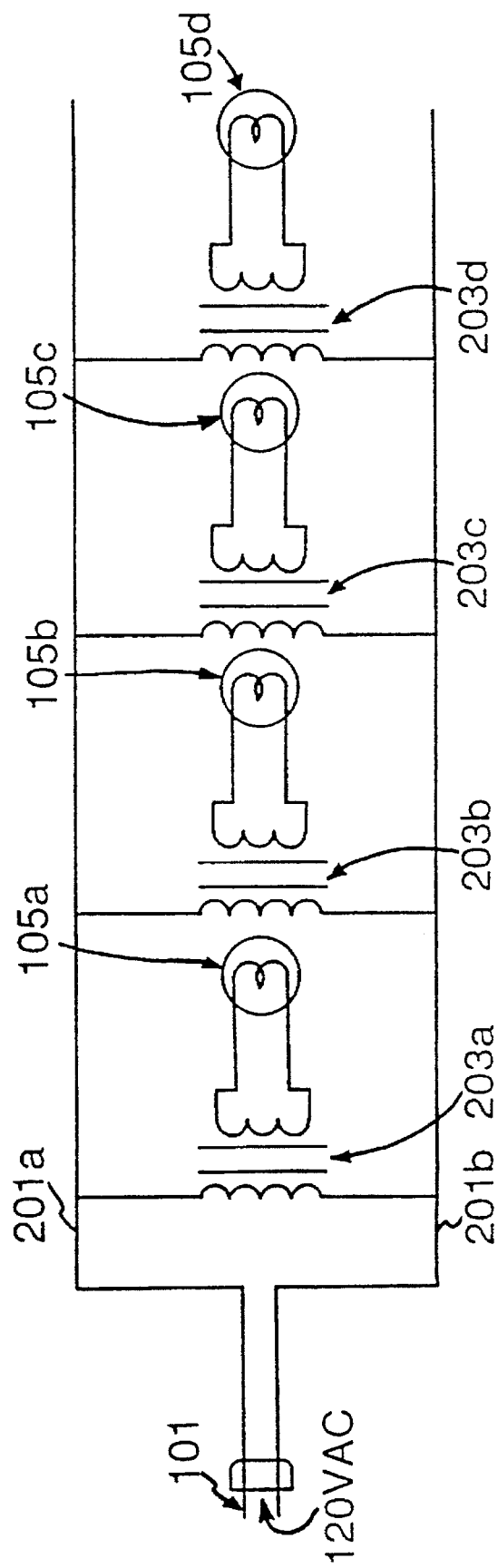
FIG. 2 is a schematic drawing of a prior art system employing a local stepdown transformer for each lamp load.

Low voltage power, for example, at 12 volts AC is produced at the output terminals of the secondary winding 103b of stepdown transformer 103, as described above in connection with FIG. 1. This low voltage power is then supplied through wires 301a and 301b to the lamp loads 105a–105d. However, the section A of wires 301a and 301b which runs parallel and receives the lamp loads 105a–105d is supplied with power by a different circuit than a similar section A of prior art systems. Where the prior art systems applies power between adjacent ends of section A of wires 107a and 107b, the present invention applies power between one end of section A of wire 301a and the opposite end of section A of wire 301b. Thus, the path length of the combined supply wires 301a and 301b connected to each of the lamp loads 105a–105d is the same. For example, if the path lengths feeding lamp loads 105a and 105b are compared, it is found that path length B in wire 301a is substantially compensated for by path length C in wire 301b. Since the path lengths feeding all lamp load are substantially equal, the same voltage drop occurs in the circuit feeding each lamp load, and therefore the resulting lamp intensities are similar for similar lamp loads.

Moreover, the illustrated embodiment of the present invention further includes a dimmer control 303 between input power source 101 and the input terminals of the primary winding 103a of stepdown transformer 103. Therefore, additional flexibility is provided in that a constant intensity may be maintained when lamp loads are added to or subtracted from the system.

Figure 3:
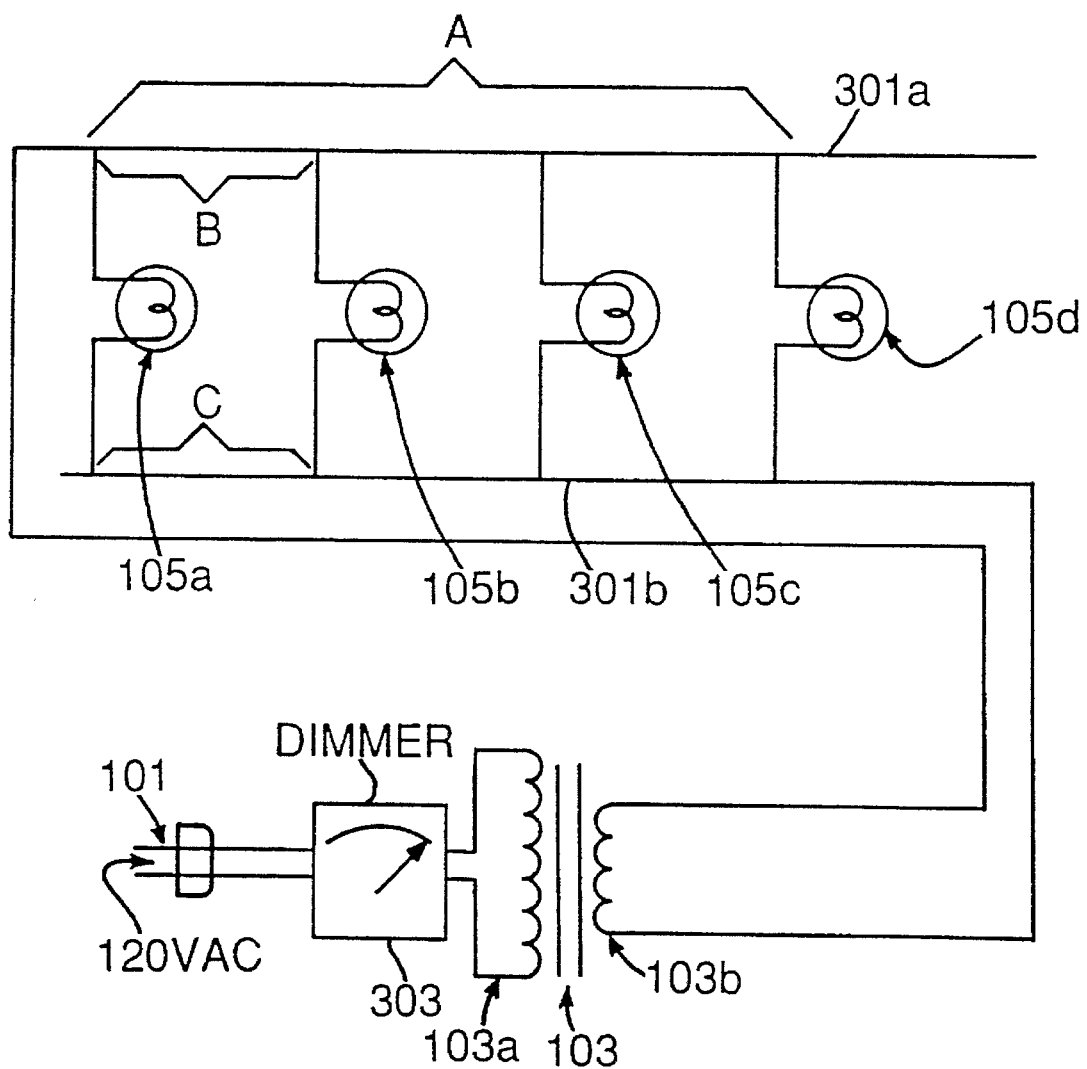
FIG. 3 is a schematic drawing of a low voltage lighting system in accordance with one aspect of the present invention.

In some applications, a manual dimmer control, such as shown in FIG. 3 may not be satisfactory. A manual control requires that an operator observe and set the correct lamp level whenever modifications are made to the system. In applications where such manual intervention is excessively costly or otherwise undesirable, the aspect of the present invention illustrated in FIGS. 4 and 5 may be employed.

Figure 4:
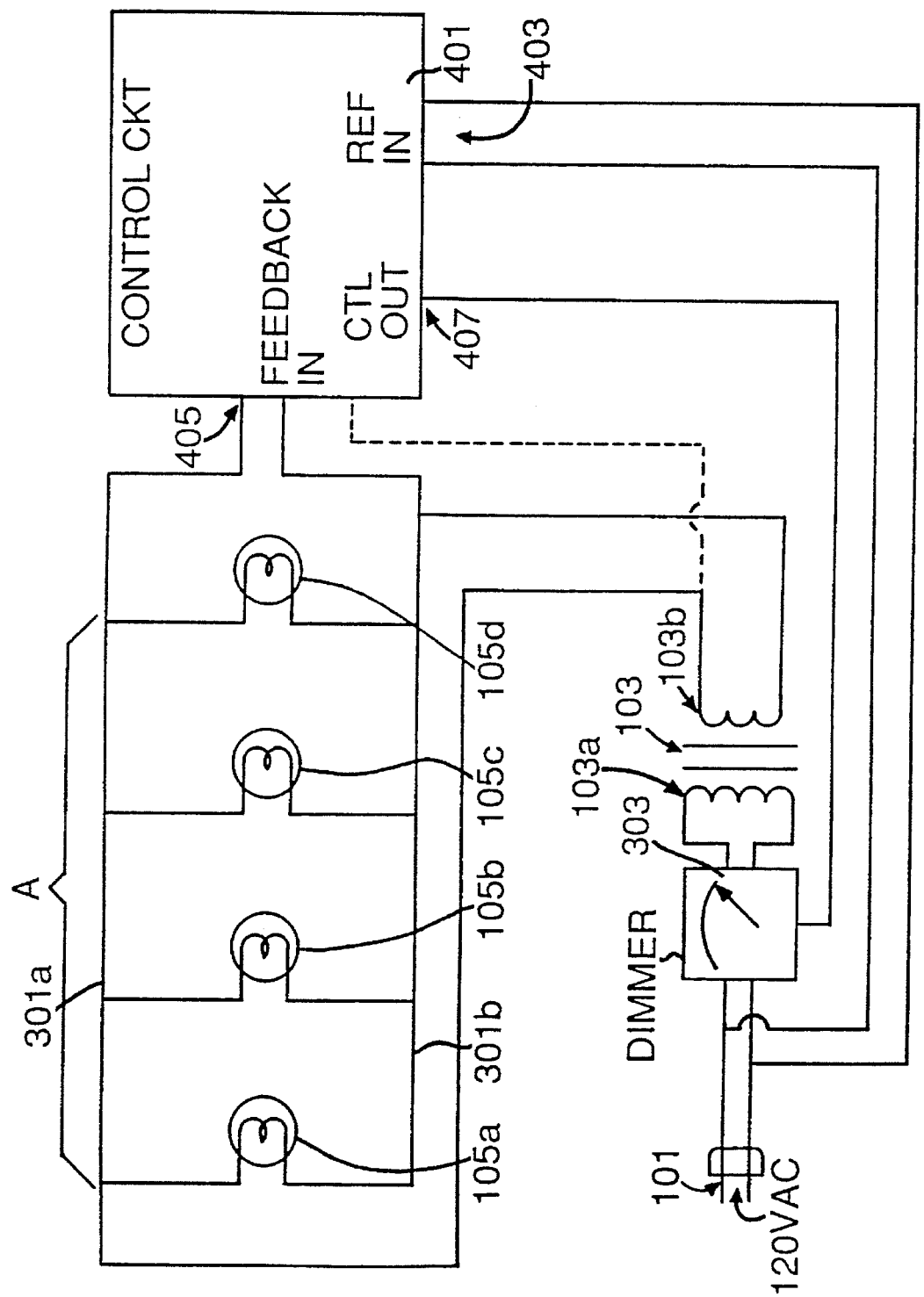
FIG. 4 is a schematic drawing of a low voltage lighting system having a feedback controlled output voltage.

The embodiment of the present invention illustrated in FIG. 4 is similar to that illustrated in FIG. 3, but with the addition of control circuit 401. The operation of control circuit 401 is now described in greater detail.

Figure 8:
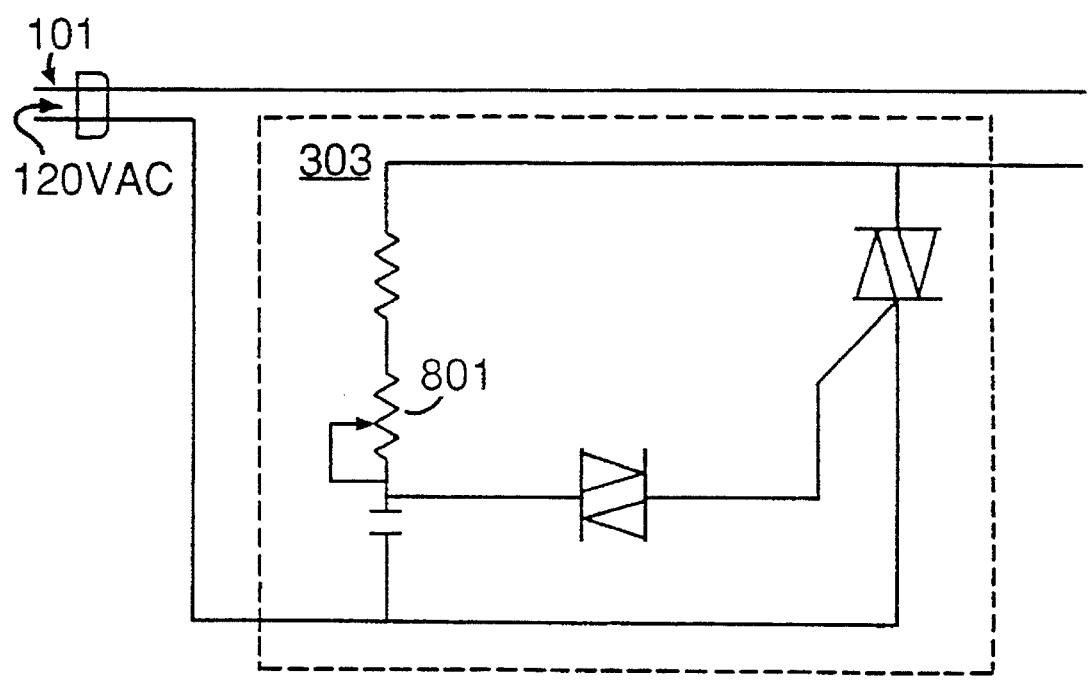
FIG. 8 is a schematic drawing of a typical prior art dimmer circuit suitable for modification and use in embodiments of the present invention.

Control circuit 401 receives a reference input 403 and a feedback input 405 including optional feedback input 406. Control output 407, which electrically controls the setting of dimmer 303 is produced. For example, dimmer 303 may be a resistance-controlled, triac-based device, such as a Model S1000, manufactured by Lutron, or any other similar circuit, for example as shown in FIG. 8. The variable resistor control of a Model S1000 (or, FIG. 8, variable resistor 801) may be replaced with a photoresistor. Control output 407 is then a lamp intensity, directed onto the photoresistor. Modifying a Model S1000 dimmer control or similar circuit to include such a photoresistive element is well within the grasp of those of ordinary skill in this art. Other details of the operation of the circuit of FIG. 8 will be well understood by those skilled in the art, and not essential to understanding the present invention. Therefore the circuit of FIG. 8 is not further described.

Figure 5:
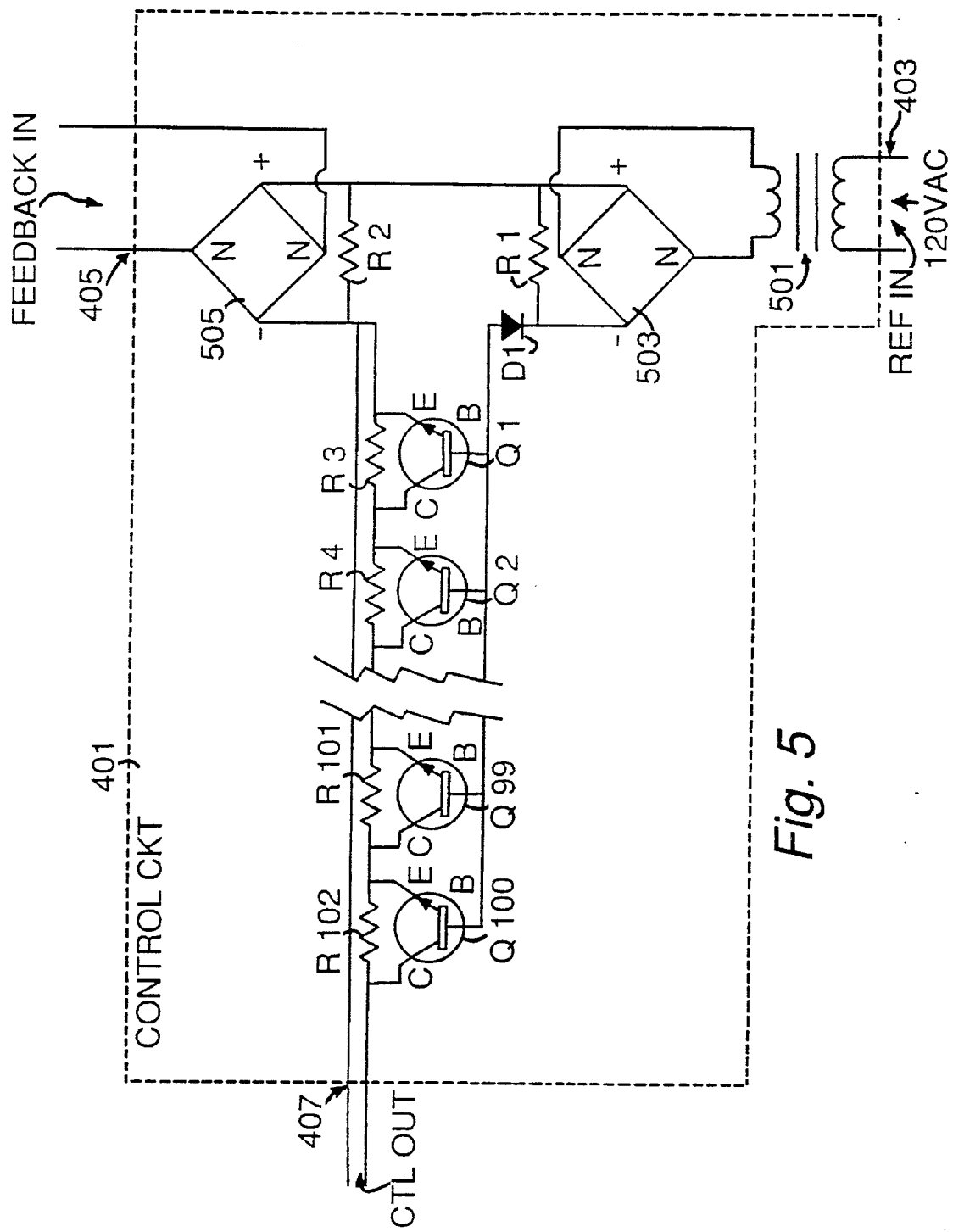
FIG. 5 is a schematic drawing of one embodiment of the control circuit of FIG. 4.

The control circuit 401 of FIG. 4 may alternatively be implemented as the electronic circuit shown in FIG. 5. In summary, the circuit of FIG. 5 receives a reference input 403 and a feedback input 405, the voltages of which are compared. The result of the comparison is that a variable resistance dependent upon the difference between the reference input and the feedback input is placed across control output 407. This circuit is now described in further detail.

Reference input 403 is applied to a reference transformer 501. Reference transformer 501 is selected to have similar characteristics to stepdown transformer 103. Thus, reference transformer 501 produces an output voltage which is substantially equal to that produced by stepdown transformer 103. This voltage is then applied to a bridge rectifier 503. The output of bridge rectifier 503 is a DC reference voltage, which is applied across resistor R1.

Feedback input 405 is applied to bridge rectifier 505. bridge rectifier 505 produces a DC feedback voltage, which is applied across resistor R2.

Bridge rectifiers 503 and 505 are arranged to have a pair of terminals of the same output polarity connected together. Therefore, the difference between the DC voltage produced by bridge rectifier 503 and the DC voltage produced by bridge rectifier 505 appears as the difference between terminals of bridge rectifiers 503 and 505 having the opposite polarity. For example, in the illustrated embodiment, the positive terminals of bridge rectifiers 503 and 505 are connected together. Therefore, the difference voltage $V_{diff}$ appears between the negative terminals of bridge rectifiers 503 and 505.

The difference voltage $V_{diff}$ is applied across a parallel network of transistors Q1–Q100. Each one of transistors Q1–Q100 has connected between a collector terminal and an emitter terminal a corresponding resistor R3-R102. The transistor and resistor pairs are arranged so that a variable number of the transistors turn on, responsive to the difference voltage $V_{diff}$, thus presenting a variable resistance at control output 407. The transistor and resistor network could be replaced with any other suitable variable resistance network, such as the FET network shown in FIG. 6.

Figure 6:
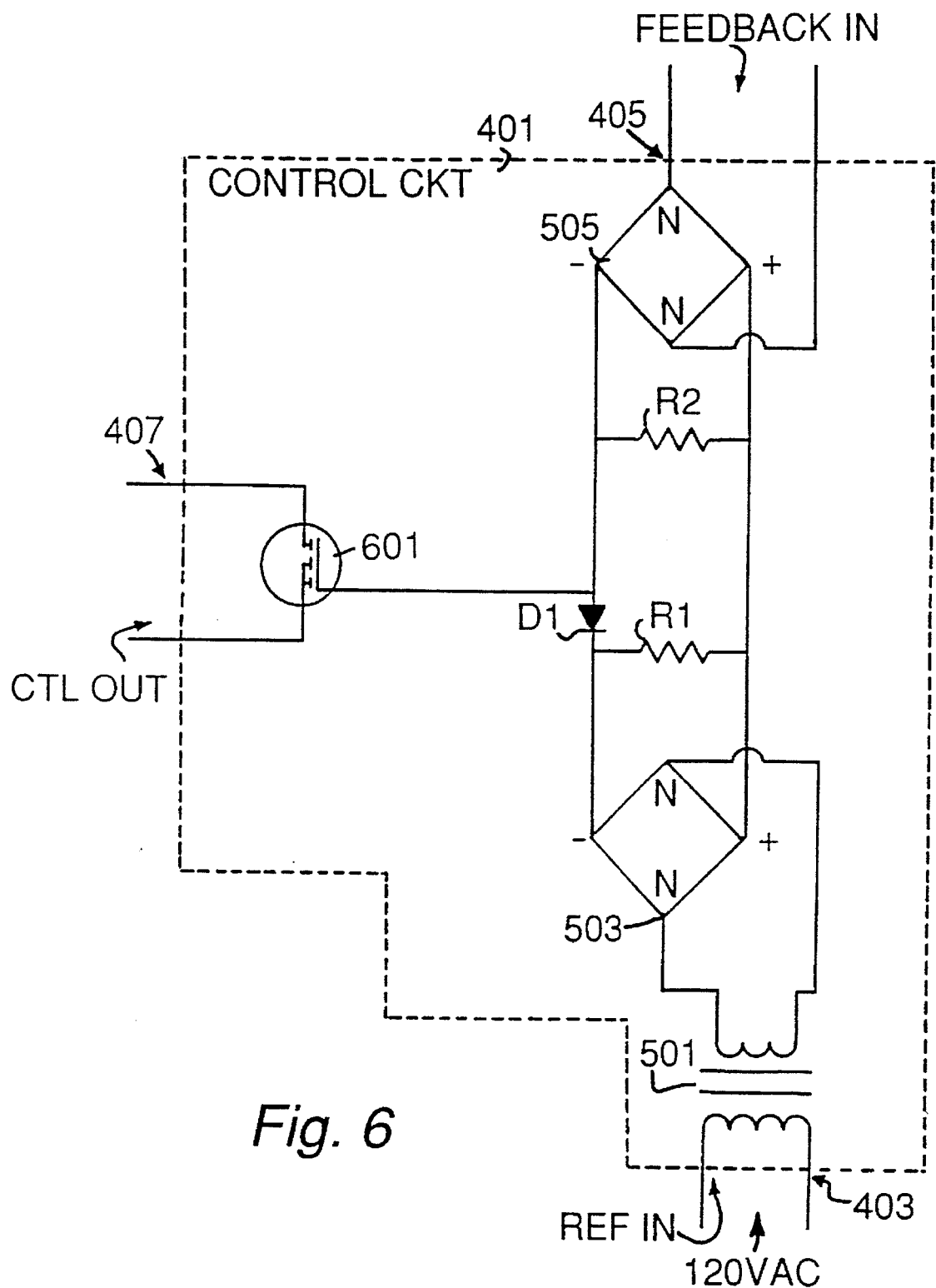
FIG. 6 is a schematic drawing of an alternate embodiment of the control circuit of FIG. 4.

The alternate embodiment of control circuit 401 shown in FIG. 6 operates in a similar fashion to the circuit shown and described in connection with FIG. 5. Reference input 403 and feedback input 405 are used to develop a difference voltage $V_{diff}$, which is applied to the gate of MOS-FET 601. MOS-FET 601 is connected to behave as a continuously variable resistor, appearing at control output 407. Therefore, control output 407 could be connected directly into one of the dimmer control circuits discussed above, in place of the conventional variable resistor control.

Figure 7:
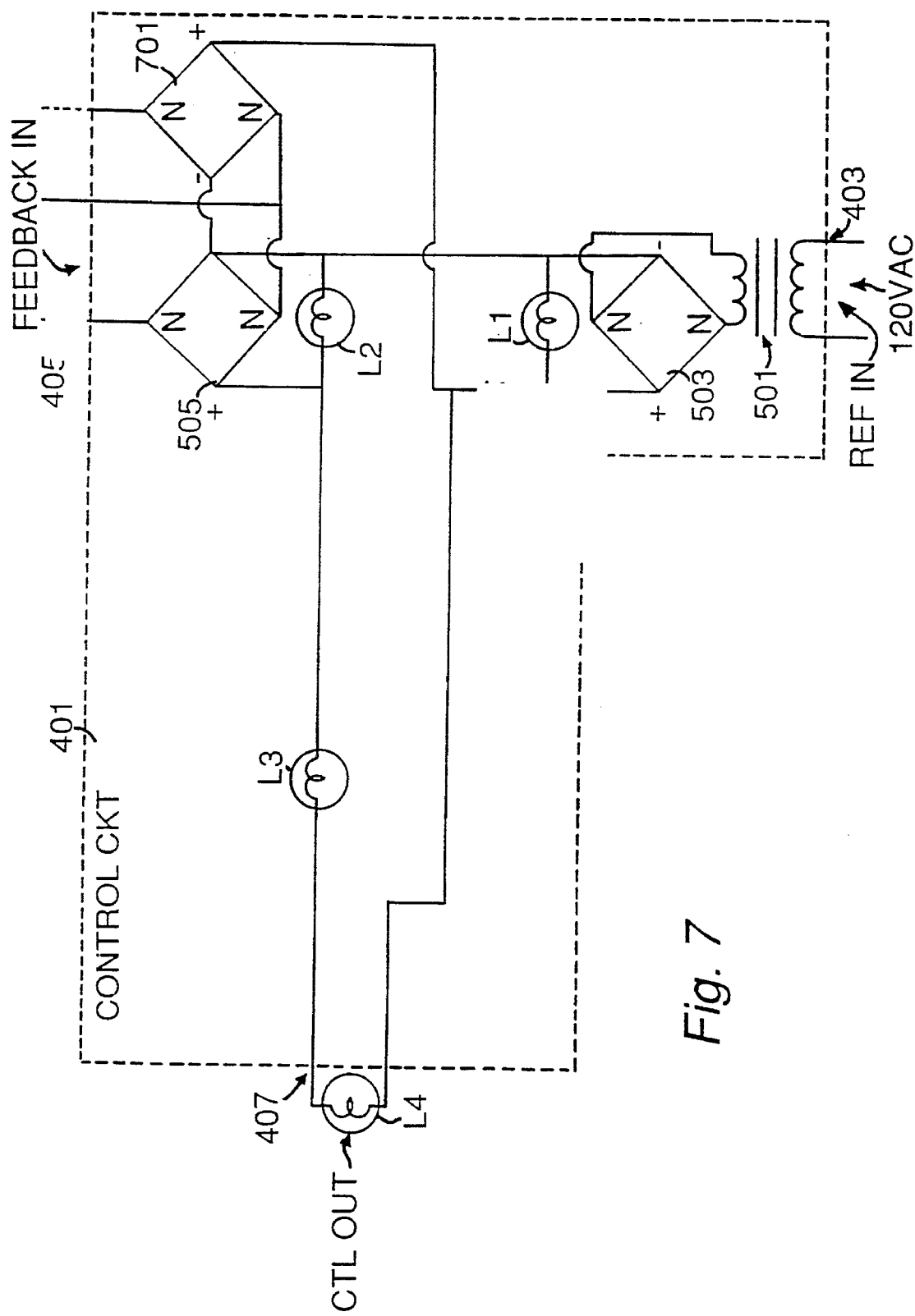
FIG. 7 is a schematic drawing of yet another alternate embodiment of the control circuit of FIG. 4.

An alternate embodiment of control circuit 401 is now described in connection with FIG. 7.

As in the embodiment described in connection with FIG. 5, reference input 403 is applied to a reference transformer 501. Reference transformer 501 develops an output voltage which is rectified by bridge rectifier 503 to produce a DC reference voltage, applied across lamp L1. Feedback input 405 is applied to bridge rectifier 505 and optional feedback input 406 is applied to bridge rectifier 701. The outputs thereof are summed to produce a DC feedback voltage, which is applied across lamp L2. This arrangement improves the feedback gain of the system. Thus, a difference voltage is produced, which appears across lamps L3 and L4. The intensity of the light emitted from lamp L4 serves as the control output 407. Thus, this embodiment of control circuit 401 may be used in connection with any of the photoelectrically controlled dimmer circuits 303, described above.

Figure 9:
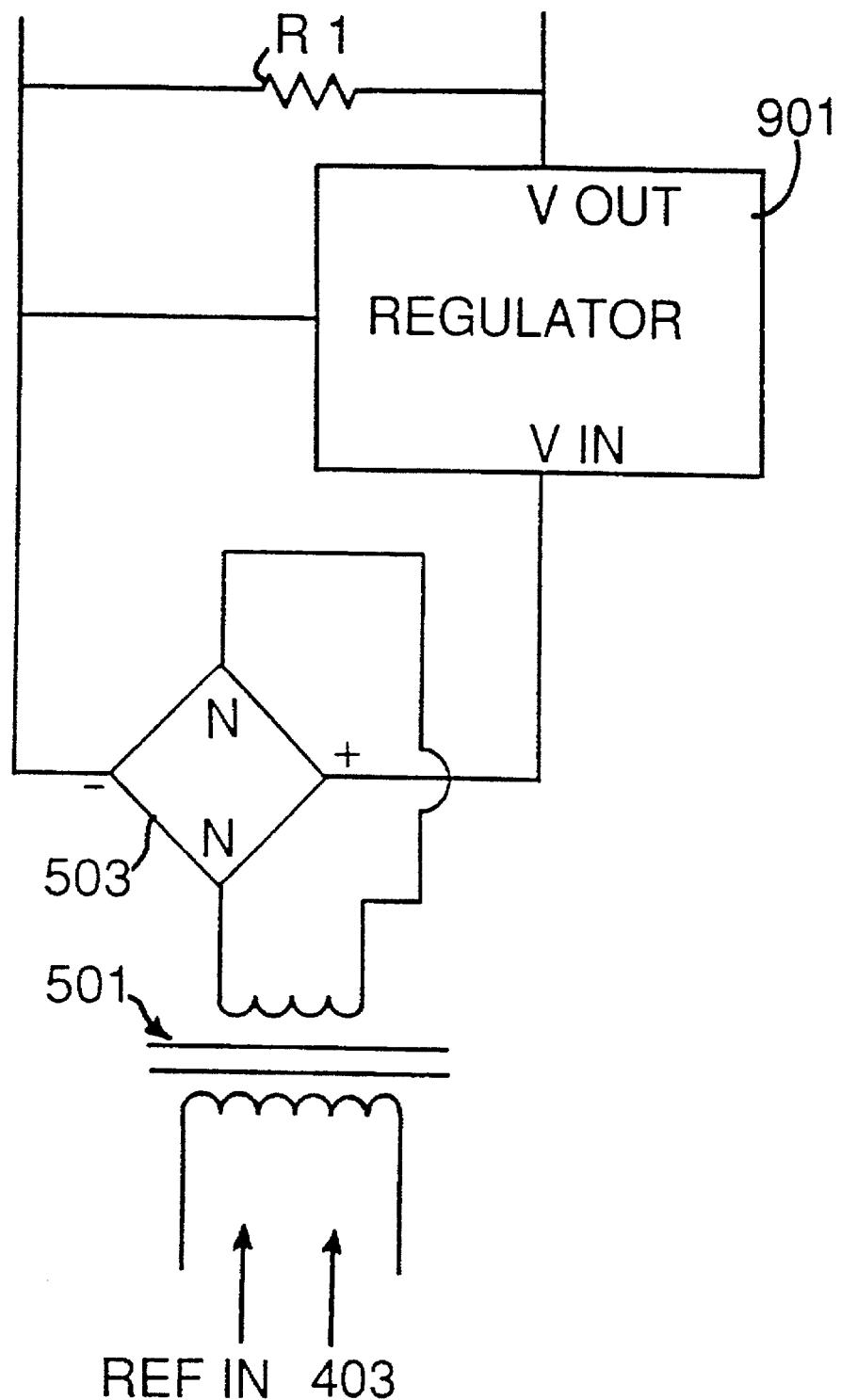
FIG. 9 is a schematic drawing of an alternate reference input circuit.

Two alternate reference input circuits are now described in connection with FIGS. 9 and 10.

in FIG. 9, the reference input circuit of FIG. 5 is reproduced, with the addition of a three terminal regulator 901 at the output. The addition of the three terminal regulator 901 ensures that the DC reference voltage appearing across resistor R1 will be constant, regardless of voltage variations at the input. This may be desirable in systems where the control of voltage variations at the loads is particularly critical. Three terminal regulators are well known in this art, and the choice of an appropriate regulator having desired voltage and current output characteristics is within the skill of those practitioner in this art.

Figure 10:
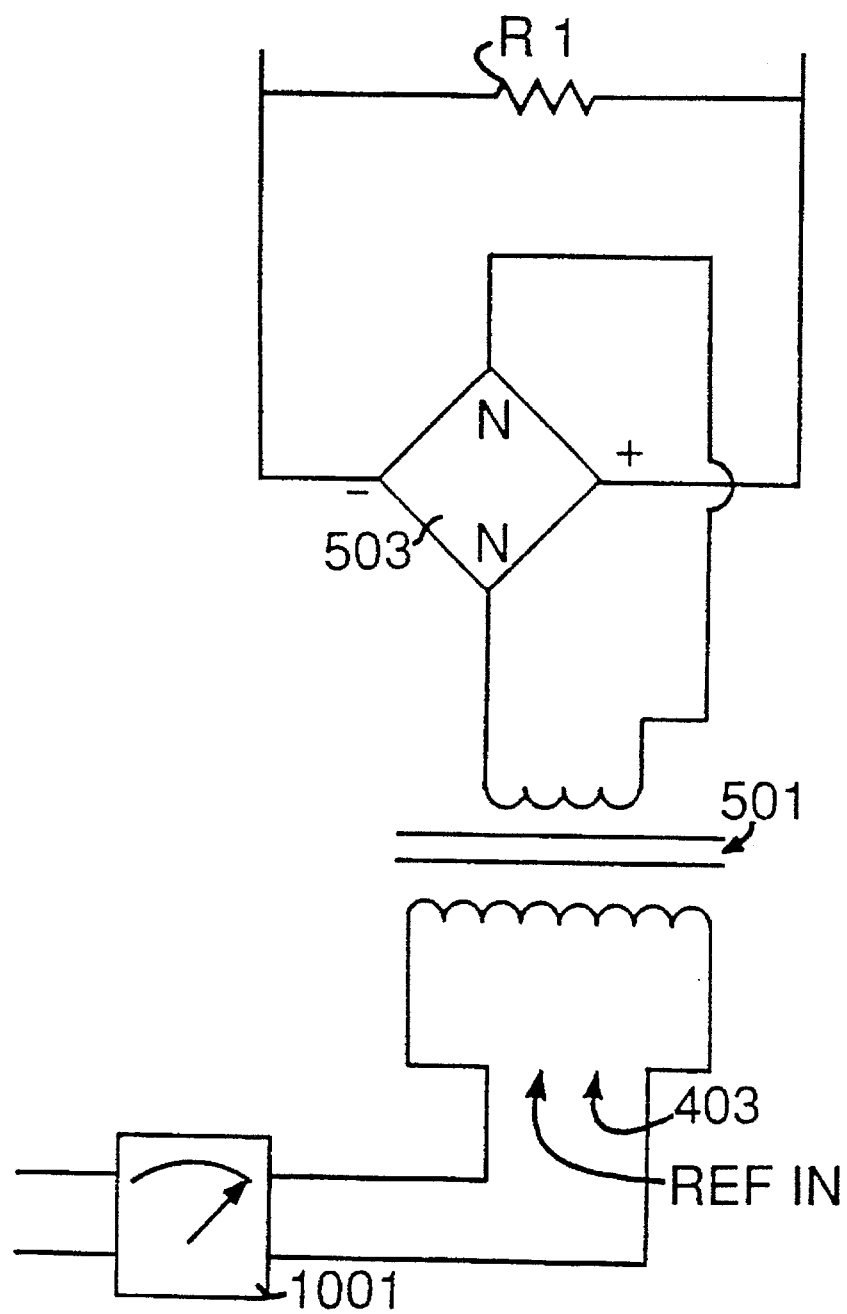
FIG. 10 is a schematic drawing of another alternate reference input circuit.

Another variation of the reference input circuit of FIG. 5 is shown in FIG. 10. This variation adds a conventional dimmer 1001 in series with the primary side of the reference transformer 501. This variation permits an operator to smoothly vary the reference voltage over a range. Thus, the regulated voltage appearing across the loads (FIG. 4 105A–105D) may be smoothly varied. If the loads (FIG. 4 105A–105D) are lamp loads, then the output intensity of the lighting system may be adjusted as desired.

The present invention has now been described in connection with a number of specific embodiments thereof. However, numerous modifications which are contemplated as falling within the scope of the present invention should now be apparent to those skilled in the art. For example, although the loads have been shown for illustrative purposes as lamps, other low voltage AC (or with the addition of a rectifier, DC) loads may be controlled. Also, many other equivalent alternatives to each of the specific control circuits illustrated will be apparent to those skilled in the art. Therefore, it is intended that the scope of the present invention be limited only by the scope of the claims appended hereto.

What is claimed is:

1. In an electrical power control and distribution system supplied by a high voltage supply, the system including a voltage conversion circuit having a high voltage input connected to the high voltage supply and a low voltage output, and supplying current from the low voltage output to first and second terminals of a plurality of electrical loads, the improvement comprising:

a first supply wire having a resistance which produces a substantial voltage drop between each of the plurality of electrical loads relative to the low voltage output, and running directly from the low voltage output to the first terminal of a first of the plurality of electrical loads, and thence in sequence to the first terminal of a last of the plurality of electrical loads; and a second supply wire having a resistance which produces a substantial voltage drop between each of the plurality of electrical loads relative to the low voltage output, and running parallel to the first supply wire directly from the low voltage output to the second terminal of the last of the plurality of electrical loads, and thence in reverse sequence to the second terminal of the first of the plurality of electrical loads; wherein a total voltage drop in a portion of the first and second supply wires supplying any one electrical load is substantially equal to a total voltage drop in a portion of the first and second supply wires supplying each other electrical load.

2. In the system of claim 1, the improvement further comprising:

means interposed between the high voltage supply and the high voltage input of the voltage conversion circuit, and having an input electrically connected between the first and second supply wires, for controlling the high voltage input of the voltage conversion circuit such that a constant low voltage output is maintained despite fluctuations in load.

3. The system of claim 2, wherein the means for controlling the high voltage input further comprises:

means connected between the first and second supply wires for sensing a feedback voltage stepdown; and a dimmer circuit connected in series with the high voltage input to the voltage conversion circuit, whereby the high voltage input of the voltage conversion circuit is controlled.

4. The system of claim 3, wherein the means for sensing further comprises:

a reference transformer having an input side connected to the high voltage supply and an output side producing a reference voltage; and a dimmer control element connected to receive the feedback voltage and further connected to receive the reference voltage, and adapted to provide an output controlling the dimmer circuit, responsive to a difference between the reference voltage and the feedback voltage.

5. The system of claim 4, wherein:

the dimmer circuit includes a photoresistively controlled triac; and the dimmer control element includes a light source having an intensity which varies responsive to the difference between the feedback voltage and the reference voltage.

6. The system of claim 4, wherein:

the dimmer circuit includes a resistively controlled triac; and the dimmer control element includes a voltage controlled resistor having a resistance which varies responsive to a voltage difference between the low voltage output and the reference voltage.

7. An electrical power control system including a plurality of low voltage loads and having a line voltage input comprising:

a dimmer circuit having an input directly connected to the line voltage input of the system, a control input and an output producing a controlled output voltage responsive to the control input;

a primary transformer having an input connected to receive the controlled output voltage of the dimmer circuit and an output producing a low voltage output supplied to the plurality of low voltage loads;

a reference transformer having an input connected to receive the line voltage input and an output producing a reference voltage;

means for controlling the dimmer circuit control input responsive to a difference between a feedback voltage received from the low voltage output supplied to the plurality of low voltage loads and the reference voltage output;

a first supply wire having a resistance which produces a substantial voltage drop between each of the plurality of electrical loads relative to the low voltage output, and running directly from the low voltage output to the first terminal of a first of the plurality of low voltage loads, and thence in sequence to the first terminal of a last of the plurality of low voltage loads; and a second supply wire having a resistance which produces a substantial voltage drop between each of the plurality of electrical loads relative to the low voltage output and running parallel to the first supply wire directly from the low voltage output to the second terminal of the last of the plurality of low voltage loads, and thence in reverse sequence to the second terminal of the first of the plurality of low voltage loads; wherein a total voltage drop in a portion of the first and second supply wires supplying any one electrical load is substantially equal to a total voltage drop in a portion of the first and second supply wires supplying each other electrical load.

8. The electrical power control system of claim 7, wherein the low voltage loads are low voltage lamps.

9. The power control system of claim 7, wherein the means for controlling the dimmer circuit control input is a light source whose intensity varies responsive to the difference between the feedback voltage and the reference voltage, and the dimmer circuit control input is a photoresistive element.

10. The electrical power control system of claim 9, wherein the low voltage loads are low voltage lamps.

11. The electrical power control system of claim 7, wherein the low voltage loads are low voltage lamps.

12. An electrical power control and distribution system supplied by a high voltage supply, the system having a plurality of electrical loads connected thereto, comprising:

a primary transformer having a high voltage input and a low voltage output;

a first supply wire having a resistance which produces a substantial voltage drop between each of the plurality of electrical loads relative to the low voltage output, and running directly from the low voltage output to the first terminal of a first of the plurality of electrical loads, and thence in sequence to the first terminal of a last of the plurality of electrical loads;

a second supply wire having a resistance which produces a substantial voltage drop between each of the plurality of electrical loads relative to the low voltage output, and running parallel to the first supply wire directly from the low voltage output to the second terminal of the last of the plurality of electrical loads, and thence in reverse sequence to the second terminal of the first of the plurality of electrical loads; and means interposed between the high voltage supply and the high voltage input of the primary transformer, and having an input electrically connected between the first and second supply wires for controlling the high voltage input of the primary transformer such that a constant low voltage output is maintained despite fluctuations in load; wherein a total voltage drop in a portion of the first and second supply wires supplying any one electrical load is substantially equal to a total voltage drop in a portion of the first and second supply wires supplying each other electrical load.

13. The system of claim 12, wherein the means for controlling the high voltage input further comprises:

means connected between the first and second supply wires for sensing a feedback voltage stepdown; and a dimmer circuit connected in series with the high voltage input to the primary transformer, whereby the high voltage input of the primary transformer is controlled.

14. The system of claim 13, wherein the means for sensing further comprises:

a reference transformer having an input side connected to the high voltage supply and an output side producing a reference voltage; and a dimmer control element connected to receive the feedback voltage and further connected to receive the reference voltage, and adapted to provide an output controlling the dimmer circuit responsive to a difference between the reference voltage and the feedback voltage.

15. The system of claim 14, wherein:

the dimmer circuit includes a photoresistively controlled triac; and the dimmer control element includes a light source having an intensity which varies responsive to the difference between the feedback voltage and the reference voltage.

16. The system of claim 14, wherein:

The dimmer circuit includes a resistively controlled triac; and the dimmer control element includes a voltage controlled resistor having a resistance which varies responsive to the difference between the feedback voltage and the reference voltage.

* * * * *